United States Patent
Cogotti

(10) Patent No.: US 7,841,233 B2
(45) Date of Patent: Nov. 30, 2010

(54) SYSTEM FOR SIMULATING THE GROUND EFFECT FOR TESTING VEHICLES OR THEIR SIMULACRA IN WIND TUNNELS

(75) Inventor: Antonello Cogotti, Turin (IT)

(73) Assignee: Pininfarina S.p.A., Torino (IT)

( * ) Notice: Subject to any disclaimer, the term of this patent is extended or adjusted under 35 U.S.C. 154(b) by 181 days.

(21) Appl. No.: 12/303,633

(22) PCT Filed: Jun. 4, 2007

(86) PCT No.: PCT/IB2007/001512

§ 371 (c)(1),
(2), (4) Date: Dec. 5, 2008

(87) PCT Pub. No.: WO2007/141639

PCT Pub. Date: Dec. 13, 2007

(65) Prior Publication Data

US 2010/0170334 A1 Jul. 8, 2010

(30) Foreign Application Priority Data

Jun. 5, 2006 (IT) .......................... TO2006A0409

(51) Int. Cl.
*G01M 9/02* (2006.01)
(52) U.S. Cl. ........................................................ 73/147
(58) Field of Classification Search ........................ None
See application file for complete search history.

(56) References Cited

U.S. PATENT DOCUMENTS

| | | | |
|---|---|---|---|
| 2002/0152799 A1* | 10/2002 | Gleason | 73/37 |
| 2006/0237237 A1* | 10/2006 | Kerschbaum et al. | 177/145 |
| 2008/0202227 A1* | 8/2008 | Ebeling et al. | 73/116.01 |
| 2010/0070126 A1* | 3/2010 | Litz | 701/29 |
| 2010/0175465 A1* | 7/2010 | Kato et al. | 73/147 |

FOREIGN PATENT DOCUMENTS

| | | |
|---|---|---|
| DE | 103 38 638 A1 | 3/2005 |
| GB | 273 742 A | 11/1927 |
| WO | WO 03/071248 A | 8/2003 |

OTHER PUBLICATIONS

International Search Report for corresponding International Patent Application No. PCT/IB2007/001512, dated Oct. 12, 2007, published on Dec. 13, 2007 as WO 2007/141693 A1.

* cited by examiner

*Primary Examiner*—Andre J Allen
(74) *Attorney, Agent, or Firm*—Heslin Rothenberg Farley & Mesiti P.C.; Victor A. Cardona, Esq.

(57) ABSTRACT

A system for simulating the ground effect for testing vehicles or their simulacra in wind tunnels includes a resting surface for the vehicle incorporating a moving belt for simulation of the ground, extending between the wheels of the vehicle, at least from one end to the other of the vehicle, as well as two auxiliary moving belts set immediately adjacent to the two sides of the front portion of the main moving belt, for simulating the ground in areas in front of the front wheels of the vehicle.

12 Claims, 3 Drawing Sheets

SYSTEM FOR SIMULATING THE GROUND EFFECT FOR TESTING VEHICLES OR THEIR SIMULACRA IN WIND TUNNELS

CROSS REFERENCE TO RELATED APPLICATIONS

This application is a national stage filing under section 371 of International Application No. PCT/IB2007/001512, filed on Jun. 4, 2007, and published in English on Dec. 13, 2007, as WO 2007/141639 A1, and which claims priority from Italian application No. TO 2006A000409 filed on Jun. 5, 2006, the entire disclosures of these applications being hereby incorporated herein by reference.

FIELD OF THE INVENTION

The present invention relates to a system for simulating the ground effect for testing vehicles or their simulacra in wind tunnels of a known type comprising a resting surface for the vehicle and an endless moving belt having its top branch included in the resting surface, for simulation of the ground in the area that extends between the wheels of the vehicle from one end to the other thereof.

STATE OF THE PRIOR ART

A system of the type referred to above is, for example, described and illustrated in WO 03/071248. In the execution of a test in a wind tunnels, the moving belt set underneath the vehicle is governed so as to move in the direction of the rear end of the vehicle so as to enable simulation, in a way that is as close as possible to reality, of the aerodynamic effect due to the relative movement between the bottom surface of the vehicle and the ground when the vehicle is travelling. The platform on which the vehicle is positioned is associated to dynamometric means for the necessary measurements, and is frequently prearranged so as to be able to turn about a vertical central axis in order to orient the vehicle in any horizontal direction with respect to the direction of the wind.

It should be noted that the device illustrated in the aforesaid prior document is designed for tests on motor vehicles to be carried out with the engine of the motor vehicle running and the transmission engaged since it comprises rollers that are free to turn by engagement of the motor-driven wheels of the motor vehicle. For the purposes of the present invention, however, said solution, albeit not excluded a priori, is not the preferred one. The invention is designed in fact to be applied in particular to platforms of the type, also in itself known, in which motor-driven means are provided, for example roller or belt means, for bringing about rotation of the wheels of the vehicle, whilst the structure of the vehicle itself is kept in a fixed position on the resting surface of the platform by supporting means of any type. The invention is hence applicable in particular to tests that are to be conducted on motor vehicles with the engine turned off, or in general vehicles of any type, including ones without an engine, or simulacra of vehicles.

SUMMARY OF THE INVENTION

The object of the present invention is to improve the known solutions of the type described above by providing in particular a system that is able to simulate, in a way perfectly adherent to reality, the aerodynamic effects to which the motor vehicle is subjected when it is travelling, in particular with reference to the ground effect.

With a view to achieving said object, the subject of the invention is a system having all the characteristics that have been referred to at the start of the present description, and further characterized in that said system is provided with at least two auxiliary endless moving belts, the top branches of which are included in the resting surface of the vehicle, for simulation of the ground, at the two sides of a front portion of the main moving belt, in such a way as to be set in the areas in front of the front wheels of the motor vehicle. In the present description and in the ensuing claims, the terms "front" and "rear" are used with reference to the orientation of an object impinged upon by the relative wind during the test. The front end of the main belt for simulating the ground is consequently the one that is impinged upon first by the wind during the test and that typically comes to be at the front part of the vehicle in the test.

Thanks to the characteristics referred to above, the system according to the invention is able to provide more precise and reliable data as regards the aerodynamic characteristics of the motor vehicle since it is able to take into account the ground effect also in the areas of the bottom surface of the vehicle situated in front of the front wheels.

It is important to note that the auxiliary moving belts that form the subject of the invention only have the function of simulating the ground in areas where the wheels of the vehicle do not rest, and are hence to be distinguished as regards positioning and function, from the known solutions in which motor-driven belts are provided for engagement of the wheels, designed to impress rotation upon the wheels. In particular, the auxiliary moving belts of the invention are designed to simulate the ground underneath the front part of the vehicle and in front of the front wheels of the vehicle. A simulation as close as possible to reality in said area is desirable in so far as the ground effect here has a relatively important impact given that said area is impinged upon by a "clean" aerodynamic flow, i.e., one not influenced by other effects, and in so far as in said area there are frequently provided, especially in high-performance motor vehicles, aerodynamic surfaces extending throughout the width of the vehicle.

In a preferred embodiment, the two auxiliary moving belts are set immediately adjacent to the two sides of the main moving belt, at a distance of some millimetres from these.

Preferably, moreover, according to a characteristic in itself known, the platform is provided with roller or belt motor-driven means for governing rotation of the wheels of the vehicle, which are constituted by a pair of front rollers or belts and by a pair of rear rollers or belts that can be adjusted in position at different distances apart, both longitudinally and transversely, to adapt to different wheel bases and tracks of vehicles. In particular, the rollers or belts for governing rotation of the wheels can be positioned immediately adjacent to the two sides of the main moving belt for simulating the ground in order to enable, for motor vehicles with a track slightly larger than the width of the main belt for simulating the ground, coverage, with the main belt, of practically the entire width of the area comprised between the wheels of the motor vehicle.

As already mentioned, it is necessary, however, to distinguish the total difference of positioning and function between the possible motor-driven belts provided for impressing rotation on the wheels of the motor vehicle and the auxiliary moving belts of the invention, which simulate the ground in the areas in front of the front wheels of the motor vehicle.

Once again in the case of the preferred embodiment, the main belt for simulating the ground is run over a front roller and a rear roller. The belt is driven by a motor that governs the rear roller. The front roller of the main belt receives motion from the belt and transmits it to the front rollers of the two auxiliary belts for simulating the ground, said front rollers being coaxial with the front roller of the main belt and coupled thereto in rotation by means of excludable coupling joints.

Furthermore, the main belt and each of the auxiliary belts are preferably each provided both with means of adjustment of tensioning of the belt and with means of orientation of a roller of the belt for correcting possible tendencies of the belt to move away from the correct position. For this purpose, the rear roller of the main belt and the rear roller of each auxiliary belt are each carried at the ends by two supports that can be adjusted in position, for example by means of electrical jacks or fluid cylinders, in the longitudinal direction of the belt so that a symmetrical adjustment of the two supports brings about an adjustment of tensioning of the belt, whilst an asymmetrical adjustment brings about a rotation of the axis of the roller of the belt about a vertical axis, which can be controlled for the purpose of correcting a tendency of the belt to come out of its correct position.

BRIEF DESCRIPTION OF THE DRAWINGS

Further characteristics and advantages of the invention will emerge from the ensuing description with reference to the annexed plate of drawings, which are provided purely by way of non-limiting example and in which.

DETAILED DESCRIPTION OF THE INVENTION

Figure 1:
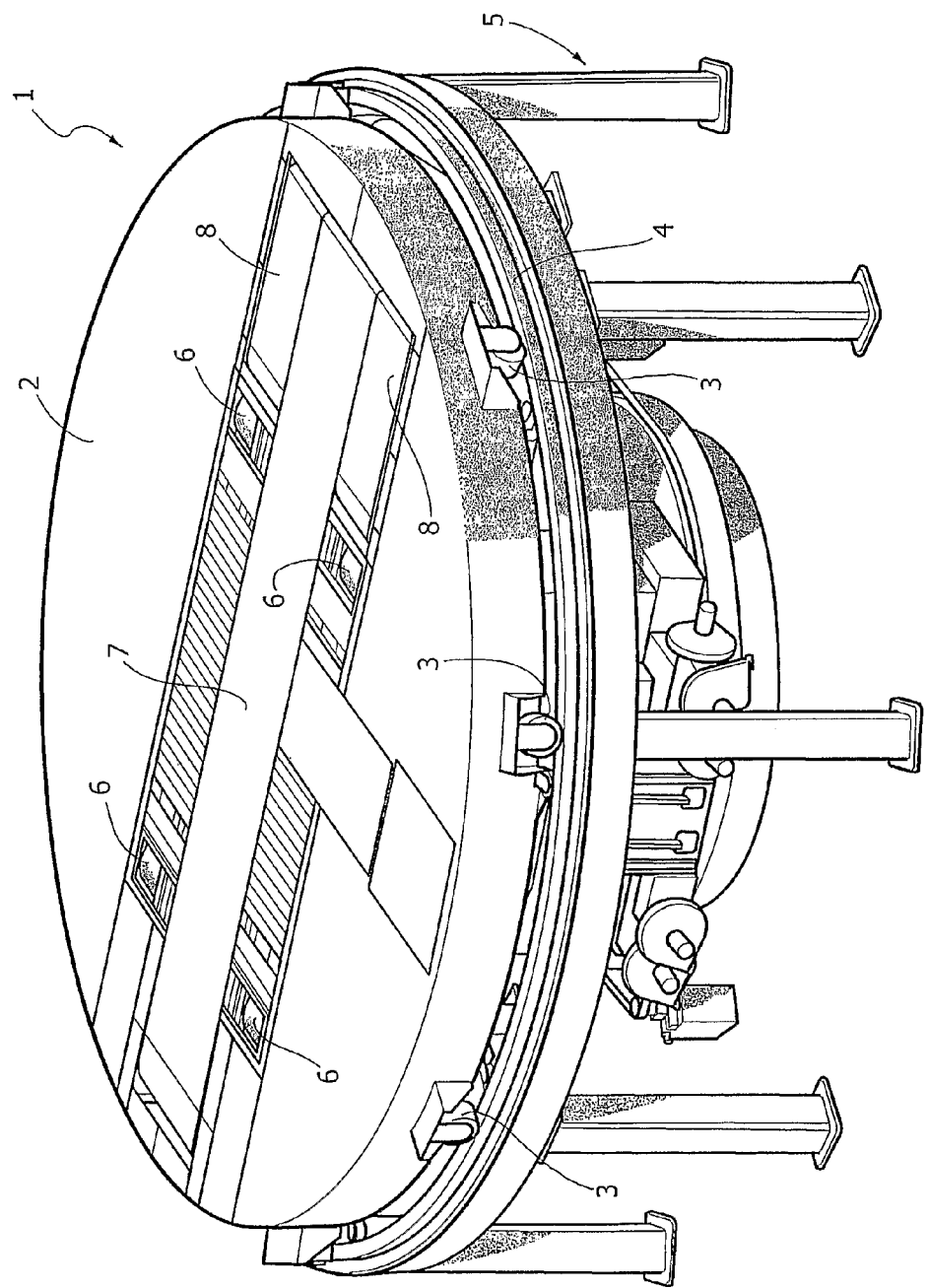
FIG. 1 is an overall perspective view of a system according to the invention.

In FIG. 1, the reference number 1 designates as a whole a platform for testing motor vehicles in wind tunnels, comprising a resting surface 2 for the motor vehicle. The platform is prearranged, in a way in itself known—thanks to engagement of a plurality of peripheral wheels 3 on a circumferential guide 4 carried by a fixed framework 5—so as to be able to rotate about a vertical central axis in order to enable orientation of the motor vehicle resting on it with respect to the direction of the wind. Once again in a way in itself known, the system is moreover associated to dynamometric means (connected to the rollers 6 described hereinafter) that can enable measurement of the forces to which the motor vehicle is subjected during the test.

In the present description and in the annexed drawings, the details of construction of said component parts of the platform are not illustrated given that, as has been said, they can be made in any known way and in so far as moreover they do not fall, taken in themselves, within the scope of the present invention.

Figure 2:
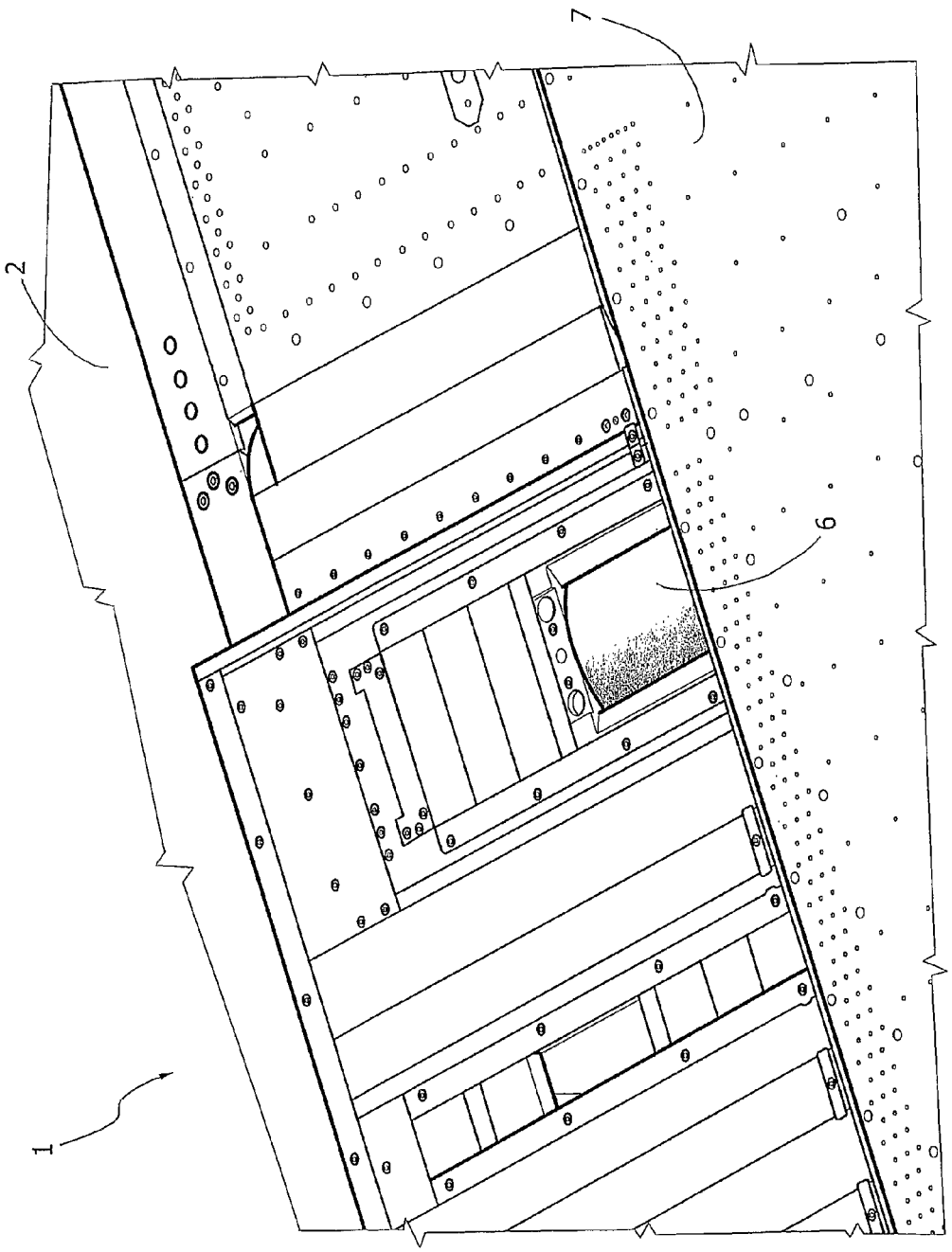
FIG. 2 is a perspective view, at an enlarged scale, of a detail of FIG. 1.

The platform 1 is moreover provided with two pairs of front and rear motor-driven rollers 6 (see also FIG. 2), designed to govern rotation of the wheels of the motor vehicle, whilst the structure of the latter is kept fixed on the platform by means of engagement underneath it of supports (not illustrated) of any type, also here according to a technique in itself known. The rollers 6 can be adjusted in position at different distances apart both longitudinally and transversely in order to adapt to different vehicle wheel bases and tracks. In particular, the rollers for governing rotation of the wheels can be positioned immediately adjacent to the two sides of the main moving belt for simulating the ground (see FIG. 2) to enable, for motor vehicles with a track slightly larger than the width of the main belt for simulating the ground, coverage, with the main belt, of practically the entire width of the area comprised between the wheels of the motor vehicle.

Also the details of construction of the motor means that govern the rollers 6 and of the means of adjustment of the wheel base and the track of the rollers 6, as well as of the motor means that control said means of adjustment, are not illustrated herein in so far as they can be made in any known way and in so far as moreover the elimination of said details from the drawings renders the latter more readily and easily understandable.

Figure 3:
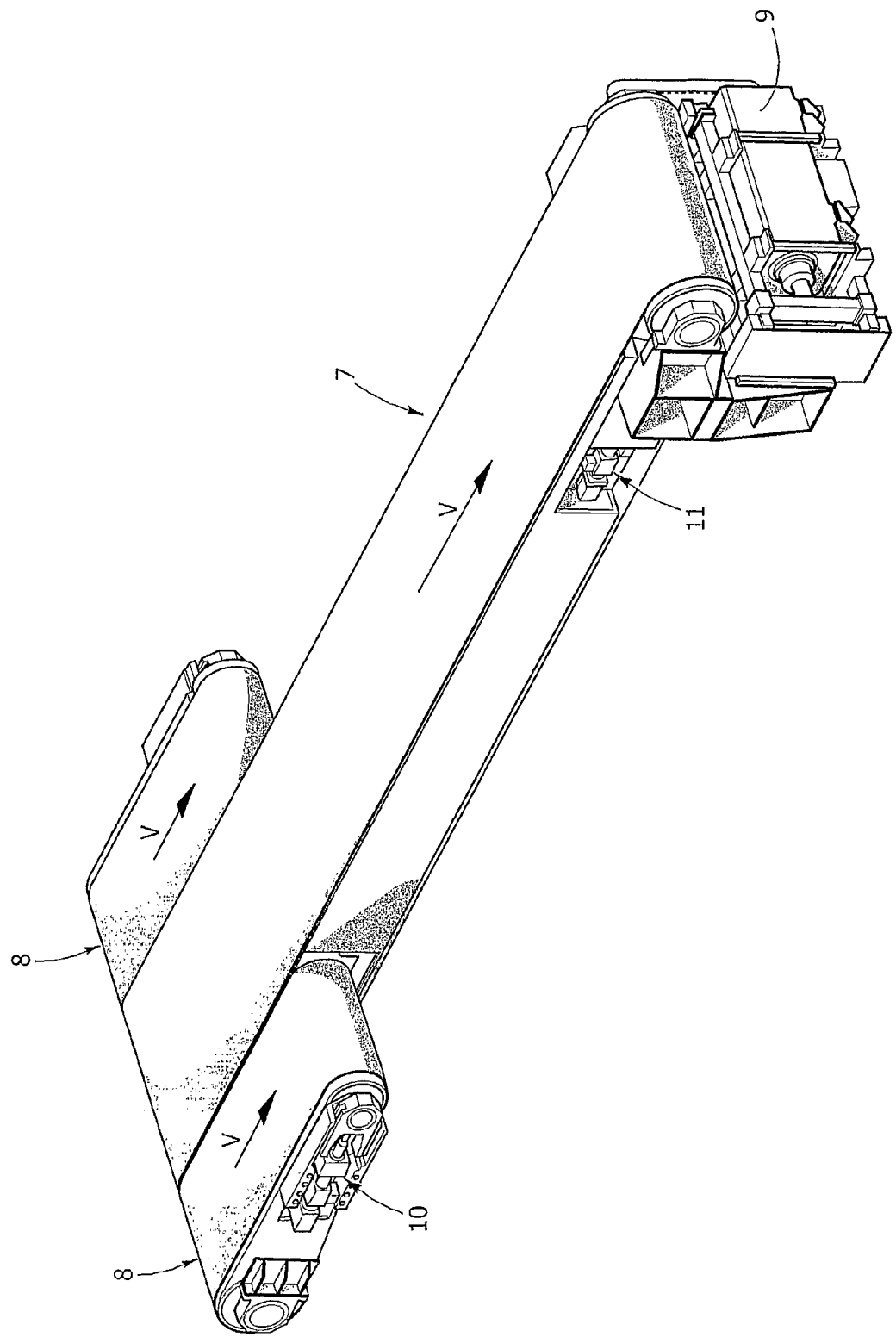
FIG. 3 illustrates a perspective view of the set of the moving belts forming part of the platform of FIG. 1.

Provided in the area of the resting surface 2, which is to be set underneath the motor vehicle, between the wheels of the motor vehicle and from one end to the other of the motor vehicle, is the top branch of an endless moving belt 7 (clearly visible as a whole in FIG. 3). The top branch of the belt 7 is set flush with the resting surface 2 and extends diametrally practically throughout the extension of the platform 1 so as to ensure coverage of the entire length of the vehicle set on the platform.

During execution of the test, the moving belt 7 is set in movement so that the top branch moves in the direction of its rear end (i.e., in the direction of the arrow V in FIG. 1).

The function of the moving belt 7 is that of simulating the aerodynamic effect, which, when the motor vehicle is actually travelling, is due to the relative movement between the bottom surface of the motor vehicle and the ground.

According to the invention, for the purposes of a better simulation of the aforesaid effect, the platform is provided with two auxiliary endless moving belts 8, set at the two sides of a front portion of the main moving belt 7. Like the main moving belt 7, also the auxiliary moving belts 8 have their top plane branches included in the resting surface 2 and flush with said resting surface, which means that the top branches of the main moving belt 7 and of the auxiliary moving belts 8 are substantially co-planar to one another.

In the preferred embodiment that is illustrated in FIG. 3, the main moving belt 7 and the auxiliary belts 8 have their front rollers set coaxially so that the set of the three belts, viewed from above, defines a T-like configuration. The two auxiliary belts also come to be governed so that their top branches move in the direction of their rear ends (see arrows V in FIG. 3) in such a way as to enable simulation of the ground effect that acts in the areas of the bottom surface of the motor vehicle set in front of the front wheels of the motor vehicle. As may be seen in FIG. 1, in fact, the two conveyor belts 8 are located in positions in front of the areas in which the rollers 6 are provided for engagement of the front wheels of the motor vehicle.

Once again in the case of the preferred embodiment illustrated herein, the main belt 7 for simulating the ground is driven by a motor 9 that governs its rear roller. The front roller of the main belt receives motion from the belt 7 and transmits it to the front rollers of the two auxiliary belts 8, which are coaxial with the front roller of the main belt and coupled thereto in rotation by means of excludable coupling joints (not illustrated) of any known type. In this way, a speed of translation of the three belts that is always the same is obtained in a simple and efficient way.

Furthermore, once again in the case of the preferred example illustrated, the main belt and each of the auxiliary belts are each provided both with means for adjustment of tensioning of the belt and with means for orientation of a roller of the belt, for correcting possible tendencies of the belt to move away from the correct position. For this purpose, the rear roller of the main belt 7 and the rear roller of each auxiliary belt are each carried at the ends by two supports that can be adjusted in position by means of electrical jacks or fluid cylinders 10, 11 in the longitudinal direction of the belt so that a symmetrical adjustment of the two supports brings about an adjustment of tensioning of the belt, whilst an asymmetrical adjustment brings about a rotation of the axis of the roller about a vertical axis, which can be controlled in order to correct a tendency of the belt to come out of its correct position. In the case of the example illustrated, activation of the jacks/cylinders 11 that control the set-up of the structure carrying the rear roller of the belt 7 also causes movement, together with said structure, of the motor 9, which is carried thereby and is connected by means of a belt transmission to the rear roller.

According to a further important characteristic of the invention, the two auxiliary belts 8 are set immediately adjacent to the two sides of the distal belt 7, at a distance of just a few millimetres therefrom. In this way, the simulation of the ground effect in the area of the surface set in front of the wheels is optimal.

It is important to note that the rollers or belts that turn the wheels are connected to the dynamometric means (balance) and hence the wheel/roller stresses are stresses internal to the system that do not falsify the aerodynamic measurement. The three belts, i.e., the central belt 7 and the two side belts 8, are not connected to the balance, but supported by the rotating platform in order to prevent the aerodynamic pressures on them from being measured by the balance and interpreted as lift of the vehicle.

Of course, without prejudice to the principle of the invention, the details of construction and the embodiments may vary widely with respect to what is described and illustrated herein purely by way of example, without thereby departing from the scope of the present invention.

In particular, the structure and arrangement of the motor and of the transmission for controlling movement of the belts can be any whatsoever. It is moreover possible to envisage separate motors for controlling the main belt and the auxiliary belts. Furthermore, also the details regarding the construction of the dynamometric platform and any further constructional details of the moving belts can vary widely with respect to the example illustrated.

Furthermore, there is not ruled out the possibility of envisaging, in addition to the two auxiliary belts 8 described above, further auxiliary belts for simulating the ground effect in positions corresponding to other areas of the bottom surface of the motor vehicle.

In addition, as already referred to above, it is possible to provide motor-driven belts, instead of motor-driven rollers, for controlling the wheels of the motor vehicle.

Finally, the invention also applies to platforms for tests on motor vehicles with the engine running and the wheels driven in rotation by the engine, also in this case, however, there being desirable a better simulation of the ground effect thanks to the prearrangement of the auxiliary belts of the invention.

The invention claimed is:

1. A system for simulating the ground effect for testing vehicles or their simulacra in wind tunnels, comprising:
    a resting surface for a vehicle;
    an endless main moving belt having a top branch included in a resting surface, for simulation of the ground in an area that extends between wheels of the vehicle from one end to the other end thereof; and
    at least two auxiliary endless moving belts, top branches of each of said at least two auxiliary belts included in the resting surface of the vehicle, for the simulation of the ground, at two sides of a front portion of the main moving belt for simulating the ground, in such a way as to be set in areas in front of front wheels of the vehicle.

2. The system according to claim 1, wherein the two auxiliary belts are set immediately adjacent to the two sides of the main belt, at a distance of a few millimeters therefrom.

3. The system according to claim 1, wherein the resting surface is provided with roller or belt motor-driven means for governing rotation of the wheels of the vehicle, while the structure of the vehicle is kept in a fixed position on the platform by resting on supports with which the resting surface is provided, said motor-driven means comprising a pair of front rollers or belts and a pair of rear rollers or belts that can be adjusted in position at different distances apart both longitudinally and transversely, to adapt to different vehicle wheel bases and tracks.

4. The system according to claim 3, wherein the rollers or belts for governing rotation of the wheels can be positioned immediately adjacent to the two sides of the main moving belt for simulating the ground.

5. The system according to claim 1, wherein the main belt and the auxiliary belts are governed by a single motor.

6. The system according to claim 5, wherein the main belt for simulating the ground is run over a front roller and a rear roller, said belt being driven by a motor that governs the rear roller, and the front roller of the main belt receives motion from the belt and transmits the motion to the front rollers of the two auxiliary belts for simulating the ground, said front rollers being coaxial with the front roller of the main belt and coupled thereto in rotation.

7. The system according to claim 6, wherein the front rollers of the auxiliary belts are coupled to the front roller of the main belt by excludable coupling joints.

8. The system according to claim 1, wherein the main belt and/or each of the auxiliary belts are provided with means for tensioning the belt.

9. The system according to claim 1, wherein the main belt and/or each of the auxiliary belts are provided with means for orientation in the horizontal plane of one of the rollers of the belt.

10. The system according to claim 9, wherein the rear roller of one or more of said auxiliary belts and said main belt is carried at the ends by two supports that can be adjusted in position in the longitudinal direction of the belt so that a symmetrical adjustment of the two supports brings about an adjustment of tensioning of the belt, while an asymmetrical adjustment brings about a rotation of the axis of the roller of the belt about a vertical axis, said rotation being controllable for the purpose of correcting a tendency of the belt to come out of its correct position.

11. The system according to claim 10, further comprising electrical jacks or fluid cylinders for control of the longitudinal position of the two ends of the rear roller.

12. The system according to claim 10, wherein the rear roller of the main belt for simulating the ground is carried by an orientable structure that also carries a motor for driving said roller.

* * * * *